(12) United States Patent
Wang et al.

(10) Patent No.: US 10,301,405 B2
(45) Date of Patent: May 28, 2019

(54) POLYPROPYLENE WITH NARROW MOLECULAR WEIGHT DISTRIBUTION RANGE AND PROCESSES FOR PREPARATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORP, Beijing (CN)

(72) Inventors: Liangshi Wang, Beijing (CN); Luqiang Yu, Beijing (CN); Shijun Zhang, Beijing (CN); Jinliang Qiao, Beijing (CN); Meifang Guo, Beijing (CN); Zhichao Yang, Beijing (CN); Jianjun Yin, Beijing (CN); Honghong Huang, Beijing (CN); Liping Hou, Beijing (CN); Jianfang Sheng, Beijing (CN)

(73) Assignees: Beijing Research Institute of Chemical Industry, China Petroleum & Chemical Corp, Beijing (CN); China Petroleum & Chemical Corporation, Beijing (CN)

( * ) Notice: Subject to any disclaimer, the term of this patent is extended or adjusted under 35 U.S.C. 154(b) by 56 days.

(21) Appl. No.: 14/067,278

(22) Filed: Oct. 30, 2013

(65) Prior Publication Data

US 2014/0121339 A1 May 1, 2014

(30) Foreign Application Priority Data

Oct. 30, 2012 (CN) .......................... 2012 1 0425066

(51) Int. Cl.
*C08F 110/06* (2006.01)
*C08L 23/10* (2006.01)
*C08F 2/34* (2006.01)

(52) U.S. Cl.
CPC ............. *C08F 110/06* (2013.01); *C08L 23/10* (2013.01)

(58) Field of Classification Search
CPC ........ C08F 110/06; C08F 2/34; C08F 4/6548; C08F 2500/12; C08F 2500/15
USPC ....................................................... 526/351
See application file for complete search history.

(56) References Cited

U.S. PATENT DOCUMENTS

| 6,084,041 A * | 7/2000 | Andtsjo et al. ................. 526/64 |
| 6,207,600 B1 * | 3/2001 | Nakajima ................. D01F 6/06 428/373 |
| 6,562,914 B1 | 5/2003 | Andtsjö et al. |
| 6,649,666 B1 * | 11/2003 | Read ...................... C08J 9/0033 521/142 |
| 2004/0122196 A1 * | 6/2004 | Pierini .................. C08F 110/06 526/351 |
| 2008/0161513 A1 | 7/2008 | Wang et al. |

FOREIGN PATENT DOCUMENTS

| CN | 88104093 | 12/1988 |
| CN | 1097770 A | 1/1995 |
| CN | 1147523 A | 4/1997 |
| EP | 0361494 A2 | 4/1990 |
| EP | 0 517 183 A2 | 12/1992 |
| EP | 0 919 572 A1 | 6/1999 |
| EP | 1 632 529 A1 | 3/2006 |
| EP | 2 145 923 A1 | 1/2010 |
| JP | 60-53510 | 3/1985 |
| JP | H072925 | 1/1995 |
| JP | 2002-501594 A | 1/2002 |
| JP | 2003-327614 A | 11/2003 |
| JP | 2009-529087 | 8/2009 |
| KR | 1999-0064159 | 7/1999 |
| WO | WO 97/13790 | 4/1997 |
| WO | WO 2007/102652 A1 | 9/2007 |

OTHER PUBLICATIONS

First Office Action of Chinese Application CN201210425066.6 dated Jun. 24, 2015.
Second Office Action of Chinese Application CN201210425066.6 dated Dec. 15, 2015.
English language Abstract for CN88104093 filed Dec. 21, 1988.
Taiwanese Office Action dated Apr. 17, 2017 for Taiwan Application No. 102139087.
Pasquini, ed., *Polypropylene Handbook*, 2nd Edition, Hanser Publishers, Munich, Germany, p. 310 (2005).
Vasile, ed., *Handbook of Polyolefins*, 2nd Edition, Marcel Dekker, Inc., New York, NY, p. 240 (2000).
Belgian Search Report for Belgian Patent No. BE 201300730, dated Jan. 21, 2014.
S Abedi et al., "Effect of Polymerization Time on the Molecular Weight and Molecular Weight Distribution of Polypropylene," Journal of Applied Polymer Science, Published Jan. 26, 2006, 100:368-371, Hoboken, NJ.
Paolo Galli et al., "Polypropylene, a Technology Driven History", Proceedings of the "Giulio Natta" celebration conference, Jun. 12, 2003, Ferrara, Italy.
David Fischer et al., "The influence of regio- and stereoirregularities on the crystallization behaviour of isotactic poly(propylene)s prepared with homogeneous group IVa metallocene/methylaluminoxane Ziegler-Natta catalysts", Macromolecular Chemistry & Physics, Published Apr. 1994, 195: 1433-1441, Basel, Switzerland.
Daniela Held et al, "Tips and Tricks: GPC/SEC," The Column, Published Oct. 2007, pp. 15-17, http://www.thecolumn.eu.com.
He-Xin Zhang et al., "Control of Molecular Weight Distribution for Polypropylene Obtained by Commercial Ziegler-Natta Catalyst: Effect of Electron Donor", Macromolecular Research, Published Jun. 24, 2011, 19(6):622-628, Springer, New York, NY.

(Continued)

*Primary Examiner* — William K Cheung
(74) *Attorney, Agent, or Firm* — Finnegan, Henderson, Farabow, Garrett & Dunner LLP

(57) ABSTRACT

Disclosed herein are a polypropylene with narrow molecular weight distribution and a process for preparing the same in a reactor using a Ziegler-Natta catalyst.

45 Claims, No Drawings

(56) References Cited

OTHER PUBLICATIONS

Alshaiban, A. and Soares, J.B., "Effect of Hydrogen, Electron Donor and Polymerization Temperature on Poly(propylene) Microstructure" Macromolecular Symposium, (2012) 312:72-80.

* cited by examiner

POLYPROPYLENE WITH NARROW MOLECULAR WEIGHT DISTRIBUTION RANGE AND PROCESSES FOR PREPARATION THEREOF

Disclosed herein are a polypropylene with narrow molecular weight distribution and a process for preparing the same, such as a polypropylene with narrow molecular weight distribution which is directly prepared by polymerization in reactors using a Ziegler-Natta catalyst.

Molecular weight distribution width of polypropylene is an important structural parameter, and may directly influence processing behavior and physical and mechanical properties of polypropylene. Polypropylene with narrow molecular weight distribution may have a wider Newton plateau zone during the flowing, less change of viscosity with fluctuation of shear rate, and it is easier to stably control extrusion amount, and it is particularly suitable for molding processes requiring low viscosity and high fluidity. For example, in the aspect of applications such as spinning, the molecular weight distribution of polypropylene may need to be controlled as narrow as possible to improve nozzle pressure stability and to ensure uniformity of fineness of filaments; in the aspect of high-fluidity injection molding, a narrow molecular weight distribution may facilitate reducing the warpage of articles and improving the impact behavior of articles; in case that a clarifier is not added, a narrow molecular weight distribution may also help to improve transparency of samples and reduce the haze. In the industry, a process for preparing polypropylene with narrow molecular weight distribution is usually degradation by adding a peroxide (so-called "controlled rheology polypropylene"). But the use of peroxide may increase the cost of products, and at the same time the residual peroxide may also readily cause odor in finished articles, which limits their application in some fields.

The present inventors found, by studying that using a Ziegler-Natta catalyst, a polymer of propylene with a narrow molecular weight distribution can be directly prepared by polymerization in reactors.

Disclosed herein is a polypropylene with a narrow molecular weight distribution. The preparation of the polypropylene with narrow molecular weight distribution according to the present disclosure does not use a peroxide, which reduces cost. The resulting product has no abnormal odor, and has a higher crystallization temperature in comparison with polypropylenes with narrow molecular weight distribution obtained by degradation process, which indicates that it has higher crystallization rate, and facilitates shortening molding processing cycle and increasing molding efficiency. Further, the polypropylene with narrow molecular weight distribution as disclosed herein may have relatively high and adjustable isotacticity, relatively high melting point and crystallization temperature, better cost performance and wider applications.

The narrow molecular-weight-distribution polypropylene of the present disclosure may have a molecular weight distribution index (polydispersity index), Mw/Mn, of 2.5 to 5.5, for example, 3.0 to 4.9; and a polydispersity index of high-molecular weight tail in molecular weight distribution width, $PI_{HT}$, of greater than 1.9, for example, greater than 2.1. The polydispersity index of high-molecular weight tail, $PI_{HT}$, is one of the important features of the narrow molecular-weight-distribution polypropylene of the present disclosure to be distinguished from narrow molecular-weight-distribution polypropylene obtained by peroxide degradation. Higher $PI_{HT}$ means a more significant high molecular weight tail existing in polypropylene, while the high molecular weight tail can preferentially form nuclei during the crystallization, so that the polypropylene has an increased crystallization temperature and an accelerated crystallization, which helps to shorten molding process cycle and increase molding efficiency.

The narrow molecular-weight-distribution polypropylene of the present disclosure may have isotactic pentad [mmmm] sequences in an amount of greater than 85 mol %, for example, greater than 90 mol %, further for example, greater than 93 mol %.

The narrow molecular-weight-distribution polypropylene of the present disclosure can be free of regio-irregularity caused by 2,1-insertion and 1,3-insertion of propylene. For polypropylenes with the same isotacticity in general sense, the existence of regio irregularity can result in a declined melting point of samples, and in turn affect performances thereof, for example, service temperature.

The narrow molecular-weight-distribution polypropylene of the present disclosure can have a crystallization temperature, Tc, of higher than 113° C., such as higher than 115° C.

The narrow molecular-weight-distribution polypropylene of the present disclosure can have a xylene-soluble fraction of less than 4.4 wt %, such as less than 2.3 wt %, further such as less than 1.6 wt %, relative to the total weight of the narrow molecular-weight-distribution polypropylene. In general sense, the lower the xylene-soluble fraction is, the higher the isotacticity of the material is, and thus the better the rigidity and the heat resistance are. In addition, for some materials contacting foods, drugs or solvents, if the xylene-soluble fraction is low, the contents of migrated, or dissolved, or extracted substances are low, and their applications are more safe and reliable.

The polypropylene of the present disclosure, based on narrow molecular weight distribution, can have a melt flow rate, MFR, ranging from 0.01 to 1000 g/10 min, such as from 1 to 1000 g/10 min, further such as from 1 to 399 g/10 min, even further such as from 10 to 100 g/10 min. It is generally assumed that the introduction of a chain transfer agent during the polymerization would result in narrowing of molecular weight distribution of the polymer. In the polymerization of propylene, hydrogen gas is usually introduced as a chain transfer agent to regulate molecular weight and melt flow rate of the polymer, the higher the concentration of hydrogen gas is, the lower the molecular weight of the obtained product is, and the higher the melt flow rate is. It is proposed in some researches that for some high performance catalysts for polypropylene, the molecular weight distribution width of the obtained products is inversely proportional to the concentration of added hydrogen gas. This means that in order to control the same narrow molecular weight distribution, it is more difficult for a sample with low melt flow rate than a sample with high melt flow rate. The present disclosure can meet both of requirements for melt flow rate and for narrow molecular weight distribution of polypropylene, to meet requirements for processing and application of materials.

The narrow molecular-weight-distribution polypropylene of the present disclosure can be directly prepared by polymerization in reactors, and can have both narrow molecular weight distribution and high polydispersity index of high-molecular-weight tail, $PI_{HT}$.

Further disclosed herein is a process for preparing the narrow molecular-weight-distribution polypropylene of the present disclosure, comprising:

(1) pre-polymerizing propylene in the presence of a Ziegler-Natta catalyst, (2) polymerizing propylene in the presence of a prepolymer of propylene obtained in step (1).

Specifically, it comprises:
(1) pre-polymerizing propylene in the presence of a Ziegler-Natta catalyst, in a gas phase or a liquid phase, under conditions of −10° C. to 50° C., and 0.1 to 10.0 MPa to obtain a prepolymer of propylene, wherein the pre-polymerization multiplication is controlled as 2 to 3000 g polymer/g catalyst, such as 3 to 2000 g polymer/g catalyst;
(2) homopolymerizing propylene in the presence of the prepolymer of propylene obtained in step (1), in a gas phase or a liquid phase, under conditions of 91 to 150° C., such as at 91 to 110° C., and 1.0 to 6.0 MPa, for the polymerization time of 0.5 to 4.0 h, to obtain the propylene polymer.

The above step (1) and step (2) of the present disclosure can be performed discontinuously in the same one reactor, and can also be performed continuously in different reactors.

In the process of the present disclosure, in the step (1), the pre-polymerization temperature is, for example, controlled ranging from −10° C. to 50° C., such as from 0 to 30° C., further such as from 10 to 25° C. The pre-polymerization pressure ranges, for example, from 0.1 to 10.0 MPa, such as from 1.0 to 6.0 MPa, further such as from 1.5 to 5.5 MPa. The pre-polymerization is, for example, performed in liquid phase, for example can be conducted as liquid phase bulk pre-polymerization of propylene. The pre-polymerization multiplication is controlled as 2 to 3000 g polymer/g catalyst, such as 3 to 2000 g polymer/g catalyst, further such as 3 to 1000 g polymer/g catalyst.

In the present disclosure, the term "pre-polymerization multiplication" refers to a ratio of the weight of prepolymer to the weight of catalyst as originally added. Generally, for batch pre-polymerization, pre-polymerization multiplication can be determined by directly measuring the weight of prepolymer obtained and dividing it by the weight of added catalyst; for continuous pre-polymerization, pre-polymerization multiplication is usually indirectly controlled by regulating resident time of the reaction and polymerization temperature. For different catalysts, different polymerization temperatures, different polymerization modes (gas phase, liquid phase bulk, etc.) and different polymerization pressures, even if the pre-polymerization retention time is the same, the pre-polymerization multiplication can be different, which could be obtained by integral calculation according to reaction kinetic curve of the catalyst.

In the process of the present disclosure, the polymerization in step (2) is performed in the presence of the prepolymer obtained in step (1), at polymerization temperature ranging from 91 to 150° C., such as from 91 to 110° C., and at polymerization pressure ranging from 1.0 to 6.0 MPa. It can be performed in either gas phase or liquid phase, and in some embodiments, it is a gas phase polymerization process. For example, it can be performed in a gas-phase horizontal reactor, which reactor has horizontal mixer shaft and quenching liquid for removing heat, has the stirring speed of 10 to 150 rpm and mixing blades whose types are selected from T type, rectangle, inclined paddles, door type, wedge-shaped and any combination thereof. The polymerization time or resident time can be controlled within 0.5 to 4.0 h. The melt flow rate of the polymer can be regulated with a molecular weight regulator (generally, $H_2$). The MFR of the obtained polymer can be controlled as from 0.01 to 1000 g/10 min, such as from 1 to 1000 g/10 min, further such as from 1 to 399 g/10 min, even further such as from 10 to 100 g/10 min.

By changing the polymerization temperature in step (2), a polypropylene product with high stereo-regularity (tacticity) can be obtained in controlled manner and narrow molecular weight distribution can be achieved.

In the process of the present disclosure, the Ziegler-Natta catalyst can be selected from Ziegler-Natta catalysts known in the art, which may include a reaction production of the following components:
(1) at least one titanium-containing solid catalyst component;
(2) at least one alkyl aluminum compound; and
optionally, (3) at least one external electron donor compound.

The titanium-containing solid catalyst component of component (1) is a reaction product of contacting at least one alkoxy magnesium compound, at least one titanium compound and at least one internal electron donor compound.

The at least one titanium compound is selected from compounds of formula (I):

$$Ti(OR)_{4-n}X_n \qquad (I)$$

in which:
R is selected from $C_1$-$C_{14}$ aliphatic hydrocarbyl or aromatic hydrocarbyl groups,
X is halogen atom,
n is an integer selected from 0 to 4; when n is equal to or less than 2, the R groups can be the same or different.

The halogen atom can be chlorine, bromine or iodine. For example, the at least one titanium compound is selected from tetraalkoxy titanium, titanium tetrahalide, alkoxy titanium trihalide, dialkoxy titanium dihalide, and trialkoxy titanium monohalide. For example, the at least one tetraalkoxy titanium is selected from tetramethoxy titanium, tetraethoxy titanium, tetra-n-propoxy titanium, tetra-iso-propoxy titanium, tetra-n-butoxy titanium, tetra-iso-butoxy titanium, tetra-cyclohexyloxy titanium, and tetraphenoxy titanium; the at least one titanium tetrahalide is selected from titanium tetrachloride, titanium tetrabromide, and titanium tetraiodide; the at least one alkoxy titanium trihalide is selected from methoxy titanium trichloride, ethoxy titanium trichloride, propoxy titanium trichloride, n-butoxy titanium trichloride, and ethoxy titanium tribromide; the at least one dialkoxy titanium dihalide is selected from dimethoxy titanium dichloride, diethoxy titanium dichloride, din-propoxy titanium dichloride, di-iso-propoxy titanium dichloride, and diethoxy titanium dibromide; the at least one trialkoxy titanium monohalide is selected from trimethoxy titanium monochloride, triethoxy titanium monochloride, tri-n-propoxy titanium monochloride, and tri-iso-propoxy titanium monochloride; in some embodiments, the at least one titanium compound is titanium tetrahalide, such as titanium tetrachloride.

The at least one alkoxy magnesium compound is selected from compounds of formula (II):

$$Mg(OR^1)_{2-m}(OR^2)_m \qquad (II)$$

wherein: $R^1$ and $R^2$ are, identical or different, independently selected from $C_1$-$C_8$ linear and branched alkyl groups, $0 \leq m \leq 2$. For example, $R^1$ and $R^2$ each are methyl, ethyl, propyl, isopropyl, butyl, isobutyl, n-hexyl, or (2-ethyl)hexyl. Further for example, $R^1$ is ethyl, $R^2$ is (2-ethyl)hexyl, $0.001 \leq m \leq 0.5$, such as $0.001 \leq m \leq 0.25$, further such as $0.001 \leq m \leq 0.1$. It is noted that the at least one alkoxy magnesium represented by formula (II) merely shows compositional contents of various alkoxy groups, i.e., molar ratios, but does not represent specific structure of alkoxy magnesium. For example, Mg(OEt)(OiPr) merely shows that the molar ratio of ethoxy to isopropoxy in the at least one alkoxy magnesium compound is 1, that is, it can be either a mixture of diethoxy magnesium and diisopropoxy magnesium with a molar ratio of 1, or ethoxy-isopropoxy magnesium compound, or a mixture of these three compounds; it can be a mixture comprising alkoxy magnesium compounds with several structures in which the total molar ratio of ethoxy to isopropoxy is 1. Herein, Et represents ethyl, iPr represents isopropyl.

The at least one alkoxy magnesium compound has sphere-like appearance, average particle size (D50) of 10 to 150 μm, such as 15 to 100 μm, further such as 18 to 80 μm, and particle size distribution index SPAN<1.1, such as particle size distribution index SPAN<1.05, wherein SPAN is calculated by following formula (III):

$$SPAN=(D90-D10)/D50 \quad (III)$$

In formula (III), D90 represents a particle diameter corresponding to an accumulation weight fraction of 90%, D10 represents a particle diameter corresponding to an accumulation weight fraction of 10%, and D50 represents a particle diameter corresponding to an accumulation weight fraction of 50%.

The at least one alkoxy magnesium compound according to the present disclosure may contain a trace of magnesium halides (for example, $MgI_2$ or $MgCl_2$) or alcoholates thereof, but its purity should be greater than 90%, such as greater than 95%, further such as above 98%, expressed as the weight content of magnesium compound of formula (II).

The at least one alkoxy magnesium compound according to the present disclosure can be prepared by reaction of magnesium metal, alcohol ($R^1OH$, $R^2OH$) corresponding to the alkoxy groups and a mixed halogenating agent in an atmosphere of inert gas. Herein, the molar ratio of magnesium metal to halogen atom in the mixed halogenating agent ranges, for example, from 1:0.0002 to 1:0.2, such as from 1:0.001 to 1:0.08; the weight ratio of alcohol combined to magnesium ranges, for example, from 4:1 to 50:1, such as from 6:1 to 25:1, wherein the molar ratio x of $R^1OH$ to $R^2OH$ is, for example, 3(2-m)/m>x>(2-m)/m. The reaction temperature ranges, for example, from 30 to 90° C., such as from 30 to 80° C., further such as from 50 to 75° C. The reaction time ranges, for example, from 2 to 30 h. In the practical operation, the end of reaction can be determined by observing the end of the release of hydrogen gas generated during the reaction.

For the preparation of the at least one alkoxy magnesium according to the present disclosure, the water content of the alcohol is not particularly limited, while the water content should be as little as possible in order that the resulting at least one alkoxy magnesium could have better performance. The water content in the alcohol is generally controlled as 1000 ppm or less, such as 200 ppm or less. In the present disclosure, the magnesium as used is magnesium metal, and in case that it has good reactivity, its shape is not particularly limited, and can be for example, in granule, riband or powder shape. The magnesium metal is, for example, sphere-like particle with average particle size ranging from 10 to 360 μm, such as from 50 to 300 μm, in order to keep the average particle size of the generated alkoxy magnesium within a suitable range and make the particle have good morphology. In addition, the surface of magnesium metal is not particularly limited, but coated film of hydroxides and the like formed on the surface of magnesium metal may slow down the reaction, so the total content of active magnesium is, for example, >95%, such as >98%.

The mixed halogenating agent can be a combination of halogen and halogen compound, and the halogen and the halogen compound can be selected from but not limited to: iodine, bromine, chlorine, magnesium chloride, magnesium bromide, magnesium iodide, potassium chloride, potassium bromide, potassium iodide, calcium chloride, calcium bromide, calcium iodide, mercuric chloride, mercuric bromide, mercuric iodide, ethoxy magnesium iodide, methoxy magnesium iodide, isopropyl magnesium iodide, hydrogen chloride, and chloroacetyl chloride, etc. The mixed halogenating agent is, for example, a combination of iodine and magnesium chloride. The weight ratio of iodine to magnesium chloride ranges, for example, from 1:0.02 to 1:20, further for example, from 1:0.1 to 1:10.

The inert gas atmosphere is, for example, nitrogen gas atmosphere, and/or argon gas atmosphere.

For the preparation of the at least one alkoxy magnesium compound according to the present disclosure, the manner of adding the halogenating agent is not particularly limited, and it can be dissolved in an alcohol and then added, or can be directly added in solid or liquid form to magnesium metal and alcohol, or can be added dropwise in the form of an alcoholic solution of the halogenating agent during the heating of magnesium metal and the alcoholic solution, thereby to perform the reaction for preparing the at least one alkoxy magnesium compound as a carrier.

For the preparation of the at least one alkoxy magnesium compound according to the present disclosure, magnesium metal, alcohol, halogenating agent and inert solvent can be initially added once, or added in batches. If the starting materials are added in batches, transient generation of a large amount of hydrogen gas can be prevented, and a mist of alcohol or halogenating agent caused by the transient generation of a large amount of hydrogen gas can be prevented, so such adding manner can, for example, be used in view of safety and reaction uniformity. The number of batches can be determined according to the size of the reactor and the amounts of various materials. After the end of reaction, the resulting final product, such as dialkoxy magnesium, can be dried and stored, or can be suspended in an inert diluent used for preparing the catalyst solid component in the next step.

During the preparation, at least one inert organic solvent can be selectively used, and can be selected, for example, from $C_6$ to $C_{10}$ alkanes and aromatics, such as hexane, heptane, octane, decane, benzene, toluene, xylene and derivatives thereof, etc.

The at least one internal electron donor compound can, for example, be selected from diether compounds of formula (IV),

in which:
  $R_1$ and $R_2$ are, identical or different, independently selected from $C_1$-$C_{20}$ linear,
  branched and cyclic aliphatic groups, $R_3$, $R_4$, $R_5$, $R_6$, $R_7$ and $R_6$ are, identical or different, independently selected from hydrogen, halogen atoms and linear and branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl groups, optionally, two or more of groups $R_3$ to $R_6$ can be bonded each other to form a ring.

In some embodiments, $R_1$ and $R_2$ are, identical or different, independently selected from $C_1$-$C_6$ linear and branched alkyl groups; $R_5$ and $R_6$ are, identical or different, independently selected from linear and branched $C_1$-$C_{10}$ alkyl, and $C_3$-$C_{10}$ cycloalkyl groups.

Exemplary compounds are as follows: 2-isopropyl-2-isopentyl-1,3-dimethoxypropane, 9,9-di(methoxymethyl)fluorene, 2-isobutyl-2-isopropyl-1,3-dimethoxypropane, 2,2-dicyclopentyldimethoxypropane, 2,2-diphenyl-1,3-dimethoxypropane, 2-isobutyl-2-isopropyl-1,3-dimethoxypropane, 2,2-dicyclopentyl-1,3-dimethoxypropane, 2,2-di-isobutyl-1,3-dimethoxypropane, etc.

For the preparation of the catalyst solid component according to the present disclosure, the molar ratio of the used amount of the at least one titanium compound to the magnesium in the at least one alkoxy magnesium compound can be (0.5 to 100):1, such as (1 to 50):1.

For the preparation of the catalyst solid component according to the present disclosure, the molar ratio of the amount of the at least one internal electron donor compound to the magnesium in the at least one alkoxy magnesium compound can be (0.005 to 10):1, such as (0.01 to 1):1.

For the preparation of the catalyst solid component of the present disclosure, the at least one alkoxy magnesium compound, internal electron donor compound and titanium compound can contact and react in any manner to prepare the catalyst solid component. For example, it can be prepared via the following methods:

Method 1:
1. The at least one alkoxy magnesium carrier, the at least one internal electron donor and at least one inert diluent are formulated into a suspension, then reacted with a mixture formed from the at least one titanium compound and at least one inert diluent, and filtered;
2. The resulting solid is added to a mixture of the at least one titanium compound and at least one inert diluent for further reaction, and filtered;
3. The reaction of step 2 is repeated for 2 to 4 times;
4. The resulting solid is washed with at least one inert solvent to obtain the catalyst solid component.

Method 2:
1. The at least one alkoxy magnesium carrier, a part of the at least one internal electron donor and at least one inert diluent are formulated into a suspension, then reacted with a mixture formed from the at least one titanium compound and at least one inert diluent, and filtered;
2. The resulting solid is added to a mixture of the at least one titanium compound, at least one inert diluent and the remaining internal electron donor for further reaction, and filtered;
3. The resulting solid is further added to a mixture of the at least one titanium compound and at least one inert diluent for further reaction, and filtered;
4. The reaction of step 3 is repeated for 2 to 4 times;
5. The resulting solid is washed with at least one inert solvent to obtain the catalyst solid component.

Method 3:
1. The at least one alkoxy magnesium carrier and at least one inert diluent are formulated into a suspension, then subjected to reaction with a mixture formed from the at least one titanium compound and at least one inert diluent, added with the at least one internal electron donor compound for further reaction, and filtered;
2. The resulting solid is added to a mixture of the at least one titanium compound and at least one inert diluent for further reaction, and filtered;
3. The reaction of step 2 is repeated for 2 to 4 times;
4. The resulting solid is washed with at least one inert solvent to obtain the catalyst solid component.

Method 4:
1. The at least one alkoxy magnesium carrier, a part of the at least one internal electron donor and at least one inert diluent are formulated into a suspension, then subjected to reaction with a mixture formed from the at least one titanium compound and at least one inert diluent, added with the remaining at least one internal electron donor compound for further reaction, and filtered;
2. The resulting solid is added to a mixture of the at least one titanium compound and at least one inert diluent for further reaction, and filtered;
3. The reaction of step 2 is repeated for 2 to 4 times;
4. The resulting solid is washed with at least one inert solvent to obtain the catalyst solid component.

For the preparation of the catalyst solid component according to the present disclosure, the molar ratio of the total amount of the at least one inert diluent to the magnesium in the at least one alkoxy magnesium compound can be (0.5 to 100):1, such as (1 to 50):1. In some embodiments, the at least one inert diluent is toluene.

For the preparation of the catalyst solid component according to the present disclosure, the at least one alkoxy magnesium carrier, the at least one internal electron donor compound, the at least one inert diluent and the at least one titanium compound are, for example, subjected to reaction under the following conditions: reaction temperature of −40 to 200° C., such as −20 to 150° C.; reaction time of 1 minute to 20 hours, such as 5 minutes to 8 hours.

For the preparation of the catalyst solid component according to the present disclosure, the order of adding the at least one alkoxy magnesium carrier, the at least one internal electron donor compound, the at least one inert diluent and the at least one titanium compound is not particularly limited, for example, these components can be mixed in the presence of the at least one inert diluent, or they can be diluted with the at least one inert diluent beforehand and then mixed. The times of mixing are not particularly limited, either, and the mixing can be performed once, or for several times.

For the preparation of the catalyst solid component according to the present disclosure, the at least one inert solvent for washing is, for example, hexane. The washing method is not particularly limited, and for example, can be decantation, filtration, etc. There is no specific limitation on used amount of the at least one inert solvent, washing time, washing times. For the compound corresponding to 1 mol magnesium, the solvent is usually used in an amount of 1 to 1000 mol, such as 10 to 500 mol, and the washing is usually performed for 1 to 24 h, such as 6 to 10 h. In addition, in view of uniformity and efficiency of washing, stirring is, for example, carried out during the washing.

The component (2) of the catalyst according to the present disclosure is at least one alkyl aluminum compound of formula (V), $$AlR'_n X'_{3-n'} \quad\quad (V)$$

in which R' is hydrogen or a hydrocarbyl-group with 1 to 20 carbon atoms, X' is halogen, n' is an integer of 1 to 3; for example, the at least one alkyl aluminum compound can be selected from triethyl aluminum, tripropyl aluminum, tri-n-butyl aluminum, tri-iso-butyl aluminum, tri-n-octyl aluminum, diethyl aluminum monohydride, di-iso-butyl aluminum monohydride, diethyl aluminum monochloride, di-iso-butyl aluminum monochloride, ethyl aluminum sesquichloride, and ethyl aluminum dichloride, such as triethyl aluminum and tri-iso-butyl aluminum.

In the propylene polymerization catalyst according to the present disclosure, the optional at least one external electron donor component can be all kinds of external electron donors as known in the art, and thus is not particularly limited. It can be, for example, selected from organosilicon compounds of formula (VII),

in which:

$R^{1''}$ and $R^{2''}$ are, identical or different, independently selected from halogen, hydrogen atoms, alkyl with 1 to 20 carbon atoms, cycloalkyl with 3 to 20 carbon atoms, aryl with 6 to 20 carbon atoms, and halogenated alkyl with 1 to 20 carbon atoms; $R^{3''}$ is one of alkyl with 1 to 20 carbon atoms, cycloalkyl with 3 to 20 carbon atoms, or aryl with 6 to 20 carbon atoms and halogenated alkyl with 1 to 20 carbon atoms; m" and n" each are an integer of 0 to 3, and m"+n"<4. The specific examples of the organosilicon compound can be trimethylmethoxysilane, diisopropyldimethoxysilane, diisobutyldimethoxysilane, isopropylisobutyldimethoxysilane, di-tert-butyldimethoxysilane, tert-butylmethyldimethoxysilane, tert-butylethyldimethoxysilane, tert-butyl-propyldimethoxysilane, tert-butylisopropyldimethoxysilane, cyclohexyl-methyldimethoxysilane, dicyclohexyldimethoxysilane, cyclohexyl-tert-butyldimethoxysilane, cyclopentylmethyldimethoxysilane, cyclopentylethyldimethoxysilane, dicyclopentyldimethoxysilane, cyclopentylcyclohexyldimethoxysilane, di(2-methylcyclopentyl)dimethoxysilane, diphenyldimethoxysilane, diphenyldiethoxysilane, phenyltriethoxysilane, methyltrimethoxysilane, methyltriethoxysilane, ethyltrimethoxysilane, propyltrimethoxysilane, propyltriethoxysilane, isopropyltrimethoxysilane, isopropyltriethoxysilane, butyltrimethoxysilane, butyltriethoxysilane, isobutyltrimethoxysilane, isobutyltriethoxysilane, pentyltrimethoxysilane, isopentyltrimethoxysilane, cyclopentyltrimethoxysilane, cyclohexyltrimethoxysilane, diphenyldimethoxysilane, diphenyldiethoxysilane, phenyltrimethoxysilane, phenyltriethoxysilane, n-propyltrimethoxysilane, vinyltrimethoxysilane, vinyltriethoxysilane, tetramethoxysilane, tetraethoxysilane, and tetrabutoxysilane, etc. These organosilicon compounds can be used alone or in combination of two or more thereof. For example, the at least one external electron donor can comprise at least one of dicyclopentyldimethoxysilane, diisopropyldimethoxysilane, diisobutyl-dimethoxysilane, cyclohexylmethyldimethoxysilane, diphenyldimethoxysilane, methyltert-butyldimethoxysilane, tetraethoxysilane, propyltriethoxysilane, and isobutyltriethoxysilane.

The used amount of the at least one alkyl aluminum compound can be a conventional amount in the art. Generally, the molar ratio of the aluminum in the at least one alkyl aluminum compound to the titanium in the catalyst solid component ranges from 20:1 to 500:1, such as from 50:1 to 500:1, further such as from 25:1 to 100:1.

In the propylene polymerization catalyst according to the present disclosure, the used amount of the at least one external electron donor is not particularly limited. In some embodiments, the molar ratio of the aluminum in the at least one alkyl aluminum compound to the silicon in the at least one external electron donor ranges from 0.1:1 to 500:1, such as from 1:1 to 200:1, further such as 3:1 to 100:1.

By increasing the polymerization temperature in step (2) for preparing polypropylene, the process according to the present disclosure can result in a polypropylene with narrow molecular weight distribution and good hydrogen regulation sensitivity, which can be used for producing products with high isotacticity and higher fluidity. With the addition of at least one external electron donor, the preparation process can result in the polymer product having a significantly reduced xylene-soluble fraction. At the same time, the process of the present disclosure further, for example, uses a specific type of catalyst, which still has a relatively high polymerization activity when used at higher polymerization temperature after pre-polymerization. Hence, the process according to the present disclosure is of better promise for application in industrial implementation.

The narrow molecular-weight-distribution polypropylene of the present disclosure can be used in spinning, thin-wall injecting, and casting processes, and in preparation of transparent materials, etc.

EXAMPLES

The present disclosure is further illustrated in conjunction with the following examples. The protection scope of the present disclosure is not restricted by these examples, but is given in the appended claims.

The parameters or data in the present disclosure, including examples, were determined according to the following measuring methods.

1. Molecular weight distribution width index Mw/Mn: the molecular weight distribution of samples was measured by using PL-GPC 220 gel permeation chromatograph (Polymer Laboratories Company, Britain) combined with an IR5 infrared detector. Three Plgel 10 μm MIXED-B columns were used in series and the column temperature was 150° C.; 1,2,4-trichlorobenzene (containing 0.3 g/1000 mL antioxidant 2,6-di-tert-butyl-p-cresol) was used as the solvent and the mobile phase, the flow rate was 1.0 mL/rain. A universal calibration was performed by using narrow distribution polystyrene standards, EasiCal PS-1, of PL Company.

2. Polydispersity index of high-molecular-weight tail in molecular weight distribution range, $PI_{HT}$: the peak molecular weight Mp, the weight-average molecular weight Mw and the Z-average molecular weight Mz were measured according to the above method 1, wherein the unit was g/mol, and formula (1) below was used for calculation:

$$PI_{HT}=10^{5}*(Mz/Mp)/Mw \quad (1)$$

3. Measurement of pentad [mmmm] content: because in $^{13}$C-NMR spectra, the methyl carbon zone with chemical shift of 19.5 to 22.5 ppm can provide tacticity information with relatively high resolution, the measurement results of his zone were used for calculating [mmmm] isotacticity, see equation (2):

$$[mmmm]\% = 100 * \frac{[mmmm]}{[mm]+[mr]+[rr]} \quad (2)$$

in which: [mm], [mr], [rr] represent triad isotactic, isotactic-syndiotactic, syndiotactic-syndiotactic contents, respectively, and can be easily calculated from the spectra.

Measurement was performed by using a 400 MHz nuclear magnetic resonance spectrometer (NMR), Mode AVANCE III, of Bruker Company, Switzerland. Solvent is deuterated o-dichlorobenzene, 250 mg sample/2.5 mL solvent. In order to avoid oxidative degradation of samples during dissolution and data collection, 2 mg of BHT (2,6-di-t-butyl-4-methyl-phenol) antioxidant was added to samples. Samples were dissolved at 140° C., $^{13}$C-NMR collection was performed at the test temperature of 125° C., with the detection head having a specification of 10 mm, with 90° pulse, with sampling time AQ of 5 seconds, with delay time D1 of 1 second, and with the times of scan of 6000 times. More details for identification of spectral peaks and the like could find in the references: (1) Hansen E W, Redford K. Nuclear Magnetic Resonance Spectroscopy of Polypropylene Homopolymers. In: Karger-Kocsis J, ed. Polypropylene: A-Z Reference. Dordrecht: Kluwer Publishers, 1999: 540-544; (2) Zambelli A. Macromolecules Vol. 8, No. 5, 1975: 687-688.

4. Detection of regio-irregularity caused by 2,1-insertion and 1,3-insertion of propylene: in the presence of some catalysts, the occurrence of "2,1" insertion and/or "1,3" insertion of the monomers during polymerization of propylene monomers results in destruction of tacticity of molecular chain structure, and the defect structures caused thereby are called herein collectively as "regio-irregularity", and regional defect structures of isotactic polypropylene have following structural schemes:

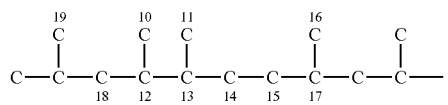

(a) head-head structure (erythro) caused by "2,1" insertion

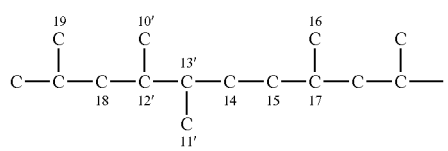

(b) head-head structure (threo) caused by "2,1" insertion

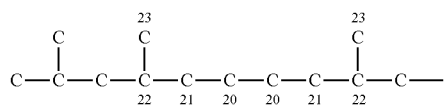

(c) defect caused by "1,3" insertion

By $^{13}$C-NMR analysis, occurrence frequency of "2,1" insertion and "1,3" insertion could be further calculated, that is:

$$\text{"2,1" insertion (\%)} = \frac{0.5 I_{\alpha\beta}}{I_{\alpha\alpha} + I_{\alpha\beta} + I_{\alpha\delta}}$$

$$\text{"1,3" insertion (\%)} = \frac{0.5 I_{\alpha\delta}}{I_{\alpha\alpha} + I_{\alpha\beta} + I_{\alpha\delta}}$$

The test conditions of $^{13}$C-NMR were the same as those of method 3, while more details such as identification of spectral peaks and data processing could be found in the references: (1) Grassi A, Zambelli A. Macromolecules, 1988, 21: 617-622; (2) Tsutsui T, Ishimaru N, Mizuno A, et al. Polymer, 1989, 30: 1350-1356.

5. Measurement of TREF (Temperature Rising Elution Fractionation) soluble fraction SF: TREF-300 Analyzer of Poly CHAR Company was used for the measurement, and specific process was as follows: 80 mg of a sample was weighed and dissolved in 40 mL of TCB (trichlorobenzene) solvent with 0.3% BHT at 150° C. for 60 rein, so that the sample was sufficiently dissolved to form a homogenous solution; 20 mL of the solution was fed to the columns, cooled at a rate of 0.2° C./min to 35° C., so that the sample gradually crystallized, isolated and precipitated on the columns during the decreasing of temperature according to crystallization capacity; it was kept at 35° C. for 10 min and then the temperature was increased at a rate of 1.0° C./min to 140° C. and elution was performed. During the elution, the flow rate in a solvent pump was controlled at 0.5 mL/min, the dissolved sample was continuously eluted by a solvent, and the correlation of the elution of the sample and the temperature was recorded. The polymer's percentage content of the eluent at 35° C. was recorded as soluble fraction SF.

6. Measurement of crystallization temperature Tc: DIAMOND Mode DSC of PE Company was used, the instrument was calibrated with metal indium and zinc standards, the sample weight was about 5 mg, the atmosphere was nitrogen gas, the gas flow was 20 mL/min. Particular antioxidant-containing sample to be tested was heated at a rate of 10° C./min to 210° C., kept constant for 5 min to eliminate thermal history, then cooled at a rate of 10° C./min to 50° C., the crystallization exotherm curve was recorded, and the temperature corresponding to the peak of the crystallization exotherm curve was recorded as crystallization temperature Tc.

7. Measurement of xylene-soluble fraction: the measurement was performed according to ASTM D5492-98.

8. Melt flow rate MFR: it was measured according to ISO 1133 at 230° C., 2.16 kg load.

9. Contents of titanium atom in the catalyst solid component and propylene polymerization catalyst component were measured by using the spectrophotometer 721 from Anhemeng (Tianjin) Sci & Tech Development Co., Ltd.

10. Particle size and particle size distribution of the at least one alkoxy magnesium and the catalyst were measured by using Malvern Mastersizer™ 2000 laser diffraction method, and n-hexane was used as the dispersant (herein, SPAN=(D90-D10)/D50).

11. Measurement of m value of the at least one alkoxy magnesium carrier: 0.1 g of the carrier was taken, added with 10 mL of 1.2 mol/l aqueous hydrochloric acid, decomposed by shaking for 24 h, the contents of ethanol and 2-ethylhexanol therein were quantified by using gas chromatography, and then m value was calculated according to the following formula:

$$m = \frac{2(w1 \times 46.07)}{w2 \times 130.23 + w1 \times 46.07}$$

in which w1 was mass of 2-ethylhexanol, and w2 was mass of ethanol.

12. The content of the at least one internal electron donor in propylene polymerization catalyst component was measured by using Waters 600E liquid chromatograph or gas chromatograph.

Example 1

1) Starting Materials

Preparation of main catalyst: To a 16 L pressure-resistant reactor with a stirrer, the inner atmosphere of which had been sufficiently replaced with nitrogen gas, 10 L of ethanol, 300 mL of 2-ethylhexanol, 11.2 g of iodine, 8 g of magnesium chloride and 640 g of magnesium powder were added. Under stirring, the temperature of the system was elevated to 75° C. for the reaction under reflux, until no more hydrogen gas was released. The reaction was terminated, 3 L of ethanol was used for washing, and after filtration and drying, sphere-like particulate dialkoxy magnesium carrier was obtained. The dialkoxy magnesium carrier had D50=30.2 μm, Span value of 0.81, m value of 0.015. 650 g of the above dialkoxy magnesium carrier and 3250 mL of toluene and 65 mL of 2-isopropyl-2-isopentyl-1,3-dimethoxypropane were formulated into a suspension. To a 16 L pressure-resistant reactor, the inner atmosphere of which had been repeatedly replaced with highly pure nitrogen gas, 2600 mL of toluene and 3900 mL of titanium tetrachloride were added, heated to 80° C., then the formulated suspension was added to the reactor, kept constant at the temperature for 1 h, 65 mL of 2-isopropyl-2-isopentyl-1,3-dimethoxypropane was added, slowly heated to 110° C., kept at the temperature constant for further 2 h, and press-filtrated to a solid. The obtained solid was added to a mixture liquid of 5070 mL of toluene and 3380 mL of titanium tetrachloride and treated under stirring at 110° C. for 1 h, and such treatment was repeated for 3 times. After press filtration, the obtained solid was washed with hexane for 4 times, 600 mL per time, press-filtered, dried, to obtain the main catalyst solid component. The obtained catalyst solid component had a content of titanium atom of 4.1 wt %, and a content of 2-isopropyl-2-isopentyl-1,3-dimethoxypropane of 11.9 wt %.

Triethyl aluminum was used as the co-catalyst: propylene and hydrogen gas in polymerization grade were subjected to dewatering and deoxygenating before use, and hexane was subjected to dewatering before use.

2) Experimental Device

The device employed a continuous pre-polymerization reactor and horizontal gas phase reactor in series. The pre-polymerization reactor had a volume of 5 L, was a vertical agitated vessel with jacketed cooling, the used stirring blades were turbine type inclined paddles, and the agitation rate was 500 rpm; the horizontal gas phase reactor had a volume of 0.2 m$^3$, and was a horizontal agitated vessel, the used stirring blades were T-type inclined paddles, the angle of inclination was 10°, the agitation rate was 100 rpm.

3) Experimental Conditions

Pre-polymerization of step (1): the reaction pressure was 2.5 MPa, the reaction temperature was 10° C., the reaction resident time was 12 minutes; the main catalyst, triethyl aluminum were fed at rates of 0.4 g/h, 0.058 mol/h, respectively; propylene was fed at rate of 10 kg/h. Pre-polymerization multiplication is 65 g polymer/g catalyst.

Gas phase polymerization of step (2): the reaction temperature was 98° C., the reaction pressure was 2.3 MPa, the reaction resident time was 60 minutes; propylene was fed at rate of 30 kg/h; hydrogen gas was fed at rate of 0.24 g/h; and the molar ratio of hydrogen gas/propylene in reaction gas phase was 0.005.

4) Experimental Results

The experiment was continuously performed for 48 h according to the above conditions, the operation of device was stable, the polymer obtained in the reaction was analyzed and measured and the results were shown in Table 1.

Example 2

1) Starting Materials (the Same as Those of Example 1)
2) Experimental Device (the Same as that of Example 1)
3) Experimental Conditions Pre-polymerization of step (1): the reaction pressure was 2.5 MPa, the reaction temperature was 10° C., the reaction time was 12 minutes; the main catalyst, triethyl aluminum were fed at rates of 0.4 g/h, 0.058 mol/h, respectively; propylene was fed at rate of 10 kg/h. Pre-polymerization multiplication is 65 g polymer/g catalyst.

Gas phase polymerization of step (2): the reaction temperature was 91° C., the reaction pressure was 2.3 MPa, the reaction time was 60 minutes; propylene was fed at rate of 30 kg/h; hydrogen gas was fed at rate of 0.4 g/h; and the molar ratio of hydrogen gas/propylene in reaction gas phase was 0.008.

4) Experimental Results

The experiment was continuously performed for 48 h according to the above conditions, the operation of device was stable, the polymer obtained in the reaction was analyzed and measured and the results were shown in Table 1.

Example 3

1) Starting Materials (the Same as Those of Example 1)
2) Experimental Device (the Same as that of Example 1)
3) Experimental Conditions Pre-polymerization of step (1): the reaction pressure was 2.5 MPa, the reaction temperature was 10° C., the reaction time was 12 minutes; the main catalyst, triethyl aluminum, dicyclopentyldimethoxysilane DCPDMS (so-called "D-Donor") were fed at rates of 1.1 g/h, 0.051 mol/h, 0.0082 mol/h, respectively; Al/Si(mol/mol)=6.2; propylene was fed at a rate of 10 kg/h. Pre-polymerization multiplication is 90 g polymer/g catalyst.

Gas phase polymerization of step (2): the reaction temperature was 98° C., the reaction pressure was 2.3 MPa, the reaction time was 60 minutes; propylene was fed at a rate of 30 kg/h; hydrogen gas was fed at a rate of 0.6 g/h; and the molar ratio of hydrogen gas/propylene in the reaction gas phase was 0.012.

4) Experimental Results

The experiment was continuously performed for 48 h according to the above conditions, the operation of device was stable, the polymer obtained in the reaction was analyzed and measured and the results were shown in Table 1.

Example 4

1) Starting Materials (the Same as Those of Example 1)
2) Experimental Device (the Same as that of Example 1)
3) Experimental Conditions Pre-polymerization of step (1): the reaction pressure was 2.5 MPa, the reaction temperature was 10° C., the reaction time was 12 minutes; the main catalyst, triethyl aluminum, diisobutyldimethoxysilane (DIBDMS, so-called "B-Donor") were fed at rates of 1.0 g/h, 0.054 mol/h, 0.0087 mol/h, respectively; Al/Si(mol/mol)=6.2; propylene was fed at a rate of 10 kg/h. Pre-polymerization multiplication is 80 g polymer/g catalyst.

Gas phase polymerization of step (2): the reaction temperature was 91° C., the reaction pressure was 2.3 MPa, the reaction time was 60 minutes; propylene was fed at a rate of 30 kg/h; hydrogen gas was fed at a rate of 0.75 g/h; and the molar ratio of hydrogen gas/propylene in the reaction gas phase was 0.015.

4) Experimental Results

The experiment was continuously performed for 48 h according to the above conditions, the operation of device was stable, the polymer obtained in the reaction was analyzed and measured and the results were shown in Table 1.

Comparative Example 1

1) Starting Materials (the Same as Those of Example 1)
2) Experimental Device (the Same as that of Example 1)
3) Experimental Conditions Pre-polymerization of step (1): the reaction pressure was 2.5 MPa, the reaction temperature was 10° C., the reaction time was 12 minutes; the main catalyst, triethyl aluminum were fed at rates of 0.40, 0.058 mol/h, respectively; propylene was fed at a rate of 10 kg/h. Pre-polymerization multiplication is 65 g polymer/g catalyst.

Gas phase polymerization of step (2): the reaction temperature was 66° C., the reaction pressure was 2.3 MPa, the reaction time was 60 minutes; propylene was fed at a rate of 30 kg/h; hydrogen gas was fed at a rate of 1.25 g/h; and the molar ratio of hydrogen gas/propylene in the reaction gas phase was 0.025.

4) Experimental Results

The experiment was continuously performed for 48 h according to the above conditions, the operation of the device was stable, the polymer obtained in the reaction was analyzed and measured and the results were shown in Table 1.

Comparative Example 2

1) Starting Materials (the Same as Those of Example 1)
2) Experimental Device (the Same as that of Example 1)
3) Experimental Conditions Pre-polymerization of step (1): the reaction pressure was 2.5 MPa, the reaction temperature was 10° C., the reaction time was 12 minutes; the main catalyst, triethyl aluminum, dicyclopentyldimethoxysilane DCPDMS (so-called "D-Donor") were fed at rates of 1.1 g/h, 0.051 mol/h, 0.0082 mol/h, respectively; Al/Si(mol/mol)=6.2; propylene was fed at a rate of 10 kg/h. Pre-polymerization multiplication is 90 g polymer/g catalyst.

Gas phase polymerization of step (2): the reaction temperature was 66° C., the reaction pressure was 2.3 MPa, the reaction time was 60 minutes; propylene was fed at a rate of 30 kg/h; hydrogen gas was fed at a rate of 2.5 g/h; and the molar ratio of hydrogen gas/propylene in the reaction gas phase was 0.05.

4) Experimental Results

The experiment was continuously performed for 48 h according to the above conditions, the operation of the device was stable, the polymer obtained in the reaction was analyzed and measured and the results were shown in Table 1.

Comparative Example 3

1) Starting Materials (the Same as Those of Example 1)
2) Experimental Device (the Same as that of Example 1)
3) Experimental Conditions Without pre-polymerization, the catalyst was directly added to the gas phase reactor. Main catalyst, triethyl aluminum were fed at rates of 0.4 g/h, 0.058 mol/h, respectively; the gas phase polymerization temperature was 98° C., the reaction pressure was 2.3 MPa, the reaction time was 60 minutes; propylene was fed at a rate of 30 kg/h; hydrogen gas was fed at a rate of 0.24 g/h; and the molar ratio of hydrogen gas/propylene in the reaction gas phase was 0.005.

4) Experimental Results

The experiment was performed according to the above conditions, and showed too low polymerization activity, and the results were shown in Table 1.

Comparative Example 4

Commercially available polypropylene product with high fluidity, narrow molecular weight distribution, with the brand of H30S, was prepared by degradation using peroxide by Zhenhai Oil Refining and Chemical Company.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| External electron donor | None | None | D-Donor | B-Donor | None | D-Donor | None | — |
| Pre-polymerization temperature, ° C. | 10 | 10 | 10 | 10 | 10 | 10 | Without pre-polymerization | — |
| Pre-polymerization time, min | 12 | 12 | 12 | 12 | 12 | 12 | — | — |
| Polymerization temperature, ° C. | 98 | 91 | 98 | 91 | 66 | 66 | 98 | — |
| $H_2$/propylene ratio in gas phase reactor (mol/mol) | 0.005 | 0.008 | 0.012 | 0.015 | 0.025 | 0.05 | 0.005 | — |
| Activity, KgPP/gCat · h | 33 | 45 | 28 | 35 | 50 | 40 | 3.0 | — |
| Mw, $10^4$ g/mol | 17.9 | 17.8 | 18.3 | 17.5 | 17.6 | 18.1 | — | 18.7 |
| Mw/Mn | 3.8 | 4.4 | 4.3 | 4.2 | 5.6 | 7.0 | — | 4.3 |
| $PI_{HT}$ | 2.35 | 2.33 | 2.3 | 2.41 | 2.96 | 3.1 | — | 1.72 |
| [mmmm]% | 89.2 | 90.1 | 92.9 | 94.4 | 89.8 | 92.6 | — | 91.9 |
| 2,1 insertion and/or 1,3 insertion of propylene | 0 | 0 | 0 | 0 | 0 | 0 | — | 0 |
| SF (analytic type TREF), % | 3.95 | 3.05 | 1.85 | 1.60 | 4.10 | 2.7 | — | 2.35 |
| Xylene-soluble fraction, wt % | 4.09 | 3.23 | 2.06 | 1.52 | 4.43 | 3.2 | — | 2.37 |

TABLE 1-continued

Polymerization conditions and properties of polymers

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| MFR, g/10 min | 46.8 | 47.6 | 44.9 | 51.7 | 52.2 | 50.5 | — | 40.0 |
| Tc, ° C. | 116.2 | 117.2 | 116.8 | 116.4 | 118.0 | 118.6 | — | 112.8 |

It can be seen from the data of Table 1:

1. The narrow molecular-weight-distribution polypropylene as prepared according to the present disclosure has relatively high isotacticity, and polypropylenes with different isotacticities can be obtained by regulating reaction conditions according to requirements, and they are free of regio-irregularity caused by 2,1-insertion and 1,3-insertion and the like of propylene.

2. By comparing the narrow molecular-weight-distribution polypropylene of the present disclosure with that of Comparative Example 4, the molecular weight distribution width expressed as the ratio of weight-average molecular weight to number-average molecular weight can reach and even exceed the level of narrow molecular weight distribution of degradation process. At the same time, the product of the present disclosure is obtained according to direct polymerization, and does not need degradation, and thus achieves low cost, environmental protection and energy saving; the polydispersity index of high-molecular-weight tail in molecular weight distribution width, $PI_{HT}$, is significantly different from that of degradation process, so that the crystallization temperature of polypropylene of the present disclosure is obviously higher than that of the narrow molecular-weight-distribution polypropylene of degradation process, which indicates that it has shorter molding cycle in comparison with the degradation process and can effectively increase molding efficiency.

3. The results of Comparative Example 1 show that: the polymer product obtained by conventional polymerization at 66° C. has a wide molecular weight distribution. In comparison with Comparative Example 1, the process for preparing the narrow molecular-weight-distribution polypropylene (Example 1 and Example 2) of the present disclosure results in the polymer product having narrower molecular weight distribution, and good H-regulation sensitivity, and the obtained polymerized products have lower xylene-soluble fractions.

4. In comparison with the polymer obtained without addition of external electron donors, the polymers obtained with addition of external electron donor (Example 3 and Example 4) have significantly increased isotacticity, and significantly decreased xylene-soluble fraction. In comparison with Comparative Example 2, the polypropylenes according to the present disclosure of Example 3 and Example 4 have narrower molecular weight distribution, and better H-regulation sensitivity, and the obtained polymerized products have lower xylene-soluble fractions.

5. The results of Comparative Example 3 show that without pre-polymerization step, direct polymerization at a relatively high temperature of 98° C. exhibits a polymerization activity of only 3000 times and no commercial application value.

What is claimed is:

1. A polypropylene, wherein the polypropylene has a molecular weight distribution index Mw/Mn ranging from 3.0 to 4.9; and a polydispersity index of high-molecular-weight tail in molecular weight distribution range, $PI_{HT}$, of greater than 2.1, wherein $PI_{HT}$ is calculated according to the following formula (1):

$$PI_{HT}=10^{5}*(Mz/Mp)/Mw \qquad (1)$$

wherein Mp is a peak molecular weight, Mw is a weight-average molecular weight and Mz is a Z-average molecular weight;

and wherein the polypropylene has a melt flow rate (MFR) of 1 to 399 g/10 min, is free of regio-irregularity caused by 2,1-insertion and 1,3-insertion of propylene, and has a crystallization temperature (Tc) of higher than 113° C.

2. The polypropylene according to claim 1, wherein the polypropylene has isotactic pentad [mmmm] sequences in a content of greater than 85 mol %.

3. The polypropylene according to claim 2, wherein the polypropylene has isotactic pentad [mmmm] sequences in a content of greater than 90 mol %.

4. The polypropylene according to claim 3, wherein the polypropylene has isotactic pentad [mmmm] sequences in a content of greater than 93 mol %.

5. The polypropylene according to claim 1, wherein the polypropylene has a crystallization temperature, Tc, of higher than 115° C.

6. The polypropylene according to claim 1, wherein the polypropylene has a xylene-soluble fraction of less than 4.4 wt %.

7. The polypropylene according to claim 6, wherein the polypropylene has a xylene-soluble fraction of less than 2.3 wt %.

8. The polypropylene according to claim 7, wherein the polypropylene has a xylene-soluble fraction of less than 1.6 wt %.

9. The polypropylene according to claim 1, wherein the polypropylene is directly prepared by polymerization in a reactor.

10. The polypropylene according to claim 9, wherein the polypropylene is prepared by a process comprising:
(1) pre-polymerizing propylene in the presence of a Ziegler-Natta catalyst,
(2) polymerizing propylene in the presence of the pre-polymer of propylene obtained in step (1), in a gas phase, at a polymerization temperature ranging from 91 to 150° C.

11. The polypropylene according to claim 10, wherein the polymerization temperature ranging from 91 to 110° C.

12. The polypropylene according to claim 11, wherein the Ziegler-Natta catalyst comprises a reaction product of the following components:
(1) at least one titanium-containing solid catalyst component, which is a reaction product of contacting at least one alkoxy magnesium compound, at least one titanium compound and at least one internal electron donor compound;

wherein the at least one titanium compound is selected from compounds of formula (I):

$$Ti(OR)_{4-n}X_n \quad (I)$$

in which:
R is selected from $C_1$-$C_{14}$ aliphatic hydrocarbyl and aromatic hydrocarbyl groups;
X is halogen;
n is an integer selected from 0 to 4;
when n is equal to or less than 2, the R groups present are identical or different;
the at least one internal electron donor compound is selected from diether compounds of formula (IV),

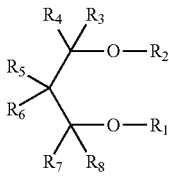

(IV)

in which:
$R_1$ and $R_2$ are, identical or different, independently selected from $C_1$-$C_{20}$ linear, branched and cyclic aliphatic groups;
$R_3$, $R_4$, $R_5$, $R_6$, $R_7$ and $R_8$ are, identical or different, independently selected from hydrogen, halogen atom and linear and branched $C_1$-$C_{20}$ alkyl, $C_3$-$C_{20}$ cycloalkyl, $C_6$-$C_{20}$aryl, $C_7$-$C_{20}$ alkylaryl and $C_7$-$C_{20}$ arylalkyl, optionally, two or more groups of $R_3$ to $R_8$ can be bonded to each other to form a ring;
(2) at least one alkyl aluminum compound; and
optionally, (3) at least one external electron donor compound.

13. The polypropylene according to claim 12, wherein $R_1$ and $R_2$ are, identical or different, each independently selected from $C_1$-$C_6$ linear and branched alkyl groups.

14. The polypropylene according to claim 12, wherein $R_5$ and $R_6$ are, identical or different, each independently selected from linear and branched $C_1$-$C_{10}$ alkyl groups and $C_3$-$C_{10}$ cycloalkyl groups.

15. The polypropylene according to claim 12, wherein the at least one alkoxy magnesium compound is selected from compounds of formula $Mg(OR^1)_{2-m}(OR^2)_m$, wherein $R^1$ and $R^2$ are, identical or different, each independently selected from $C_1$-$C_8$ linear and branched alkyl groups, and $0 \geq m \geq 2$.

16. The polypropylene according to claim 15, wherein the at least one alkoxy magnesium compound is prepared by reaction of magnesium metal, the alcohol $R^1OH$ and $R^2OH$, corresponding to the alkoxy groups, and a mixed halogenating agent in an atmosphere of inert gas, wherein the molar ratio of magnesium metal to halogen atom in the mixed halogenating agent ranges from 1:0.0002 to 1:0.2, the weight ratio of the alcohol combined to magnesium ranges from 4:1 to 50:1, wherein the molar ratio x of $R^1OH$ to $R^2OH$ is 3(2-m)/m>x>(2-m)/m, and the mixed halogenating agent is a combination of halogen and halogen compound.

17. The polypropylene according to claim 12, wherein the optional at least one external electron donor compound is selected from organosilicon compounds of formula (VII), $$R^{1'''}_{m''}R^{2''}_{n''}Si(OR^{3'''})_{4-m''-n''} \quad (VII)$$

in which:
$R^{1'''}$ and $R^{2''}$ are, identical or different, independently selected from halogen, hydrogen atom, alkyl with 1 to 20 carbon atoms, cycloalkyl with 3 to 20 carbon atoms, aryl with 6 to 20 carbon atoms and halogenated alkyl with 1 to 20 carbon atoms;
$R^{3'''}$ is selected from alkyl groups with 1 to 20 carbon atoms, cycloalkyl groups with 3 to 20 carbon atoms, aryl groups with 6 to 20 carbon atoms and halogenated alkyl groups with 1 to 20 carbon atoms;
m" and n" each are an integer of 0 to 3, and m"+n"<4.

18. A process for preparing the polypropylene according to claim 1, comprising:
(1) pre-polymerizing propylene in the presence of a Ziegler-Natta catalyst,
(2) polymerizing propylene in the presence of the pre-polymer of propylene obtained in step (1), in a gas phase, at the polymerization temperature ranging from 91 to 150° C.

19. The process according to claim 18, comprising:
(1) pre-polymerizing propylene in the presence of a Ziegler-Natta catalyst, in a gas phase or a liquid phase, under conditions of −10° C. to 50° C., and 0.1 to 10.0 MPa to obtain a prepolymer of propylene, wherein pre-polymerization multiplication is controlled as 2 to 3000 g polymer/g catalyst,;
(2) homopolymerizing propylene in the presence of the prepolymer of propylene obtained in step (1), in a gas phase, under conditions of 91 to 150° C., and 1.0 to 6.0 MPa, for the polymerization time of 0.5 to 4.0 h, to obtain the propylene polymer.

20. The process according to claim 19, wherein the pre-polymerization multiplication is controlled as 3 to 2000 g polymer/g catalyst.

21. The process according to claim 19, wherein, in step (2), the polymerization temperature ranges from 91 to 110° C.

22. The process according to claim 19, wherein step (1) and step (2) are performed discontinuously in the same one reactor, or continuously in different reactors.

23. The process according to claim 18, wherein in the step (1), the pre-polymerization temperature of propylene is controlled at 0 to 30° C.; the pre-polymerization pressure ranges from 1.0 to 6.0 MPa.

24. The process according to claim 23, wherein in the step (1), the pre-polymerization temperature of propylene is controlled at 10 to 25° C.

25. The process according to claim 23, wherein in the step (1), the pre-polymerization pressure ranges from 1.5 to 5.5 MPa.

26. The process according to claim 18, wherein step (1) is liquid phase bulk pre-polymerization of propylene at the temperature of 0 to 30° C.; and step (2) is gas phase homopolymerization of propylene at the temperature of 91 to 110° C.

27. The process according to claim 18, wherein the gas phase polymerization of propylene in step (2) is performed in a horizontal reactor which has a horizontal mixer shaft, a stirring speed of 10 to 150 rpm, and the mixing blades whose types are selected from T type, rectangle, inclined paddle, door type, wedge-shaped or any combination thereof, and which uses a quenching liquid to remove heat.

28. The process according to claim 18, wherein the Ziegler-Natta catalyst comprises a reaction product of the following components:
(1) at least one titanium-containing solid catalyst component;
(2) at least one alkyl aluminum compound; and
optionally, (3) at least one external electron donor compound.

29. The process according to claim 28, wherein the titanium-containing solid catalyst component as the component (1) is a reaction product of contacting at least one alkoxy magnesium compound, at least one titanium compound and at least one internal electron donor compound; wherein the at least one titanium compound is selected from compounds of formula (I):

$$Ti(OR)_{4-n}X_n \qquad (I)$$

in which:
R is selected from $C_1$-$C_{14}$ aliphatic hydrocarbyl or aromatic hydrocarbyl groups;
X is halogen;
n is an integer selected from 0 to 4;
when n is equal to or less than 2, the R groups present are identical or different;
the at least one internal electron donor compound is selected from diether compounds of formula (IV),

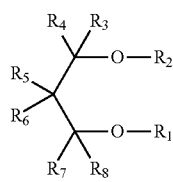

(IV)

in which:
$R_1$ and $R_2$ are, identical or different, independently selected from $C_1$-$C_{20}$ linear, branched and cyclic aliphatic groups;
$R_3$, $R_4$, $R_5$, $R_6$, $R_7$ and $R_8$ are, identical or different, independently selected from hydrogen, halogen atom and linear and branched $C_1$-$C_{20}$ alkyl, $C_3$-$C_{20}$ cycloalkyl, $C_6$-$C_{20}$aryl, $C_7$-$C_{20}$ alkylaryl and $C_7$-$C_{20}$ arylalkyl, optionally, any two or more groups of $R_3$ to $R_8$ can be bonded to each other to form a ring.

30. The process according to claim 29, wherein $R_1$ and $R_2$ are, identical or different, each independently selected from $C_1$-$C_6$ linear and branched alkyl groups.

31. The process according to claim 29, wherein $R_5$ and $R_6$ are, identical or different, each independently selected from linear and branched $C_1$-$C_{10}$ alkyl groups and $C_3$-$C_{10}$ cycloalkyl groups.

32. The process according to claim 29, wherein the at least one alkoxy magnesium compound is selected from compounds of formula $Mg(OR^1)_{2-m}(OR^2)_m$, wherein $R^1$ and $R^2$ are, identical or different, independently selected from $C_1$-C8 linear and branched alkyl groups, and $0 \leq m \leq 2$.

33. The process according to claim 32, wherein $R^1$ is ethyl group, $R^2$ is (2-ethyl)hexyl group, and $0.001 \leq m \leq 0.5$.

34. The process according to claim 33, wherein $0.001 \leq m \leq 0.25$.

35. The process according to claim 34, wherein $0.001 \leq m \leq 0.1$.

36. The process according to claim 29, wherein the at least one alkoxy magnesium compound has sphere-like appearance, an average particle size D50 of 10 to 150 µm, and a particle size distribution index SPAN<1.1, wherein SPAN is calculated by the following formula (III):

$$SPAN=(D90-D10)/D50 \qquad (III)$$

in which:
D90 represents a particle diameter corresponding to an accumulation weight fraction of 90%;
D10 represents a particle diameter corresponding to an accumulation weight fraction of 10%; and
D50 represents a particle diameter corresponding to an accumulation weight fraction of 50%.

37. The process according to claim 36, wherein the at least one alkoxy magnesium compound has an average particle size D50 of 15 to 100 µm.

38. The process according to claim 37, wherein the at least one alkoxy magnesium compound has an average particle size D50 of 18 to 80 µm.

39. The process according to claim 36, wherein the at least one alkoxy magnesium compound has a particle size distribution index SPAN<1.05.

40. The process according to claim 36, wherein the at least one alkoxy magnesium compound is prepared by the following process: under the protection of an inert gas atmosphere, reacting an alcohol and magnesium metal as staring materials with a mixed halogenating agent to prepare sphere-like particulate dialkoxy magnesium; wherein the weight ratio of the alcohol to magnesium is 4 to 50:1; the alcohol is a linear or branched monoalcohol or polyalcohol; the halogenating agent is elementary halogens and/or halides, and is used with the molar ratio of halogen atom to magnesium ranging from 0.0002:1 to 0.2:1.

41. The process according to claim 28, wherein the at least one external electron donor compound is selected from organosilicon compounds of formula (VII), $$R^{1''}{}_{m''}R^{2''}{}_{n''}Si(OR^{3''})_{4-m''-n''} \qquad (VII)$$

in which:
$R^{1''}$ and $R^{2''}$ are, identical or different, independently selected from halogen, hydrogen atom, alkyl groups with 1 to 20 carbon atoms, cycloalkyl groups with 3 to 20 carbon atoms, aryl groups with 6 to 20 carbon atoms and halogenated alkyl groups with 1 to 20 carbon atoms;
$R^{3''}$ is selected from alkyl groups with 1 to 20 carbon atoms, cycloalkyl groups with 3 to 20 carbon atoms, aryl groups with 6 to 20 carbon atoms and halogenated alkyl groups with 1 to 20 carbon atoms;
m'' and n'' each are an integer of 0 to 3, and m''+n''<4.

42. A composition, comprising the polypropylene according to claim 1.

43. A novel material, comprising the polypropylene made by the process according to claim 18.

44. A process, comprising using the polypropylene according to claim 1 in the process, wherein the process is selected from spinning, thin-wall injecting, and casting processes.

45. A process, comprising using the polypropylene made by the process according to claim 18, wherein the process is selected from spinning, thin-wall injecting, and casting processes.

* * * * *

UNITED STATES PATENT AND TRADEMARK OFFICE
CERTIFICATE OF CORRECTION

PATENT NO. : 10,301,405 B2
APPLICATION NO. : 14/067278
DATED : May 28, 2019
INVENTOR(S) : Liangshi Wang et al.

Page 1 of 1

It is certified that error appears in the above-identified patent and that said Letters Patent is hereby corrected as shown below:

On the Title Page

Item (71), Lines 3-6:
"BEIJING RESEARCH INSTITUTE OF CHEMICAL INDUSTRY, CHNA PETROLEUM & CHEMICAL CORP"

Should read:
--BEIJING RESEARCH INSTITUTE OF CHEMICAL INDUSTRY, CHINA PETROLEUM & CHEMICAL CORPORATION--.

Item (73), Lines 1-3:
"Beijing Research Institute of Chemical Industry China Petroleum & Chemical Corp,"

Should read:
--Beijing Research Institute of Chemical Industry, China Petroleum & Chemical Corporation--.

Signed and Sealed this
Twenty-sixth Day of November, 2019

Andrei Iancu
*Director of the United States Patent and Trademark Office*